Figure 1:
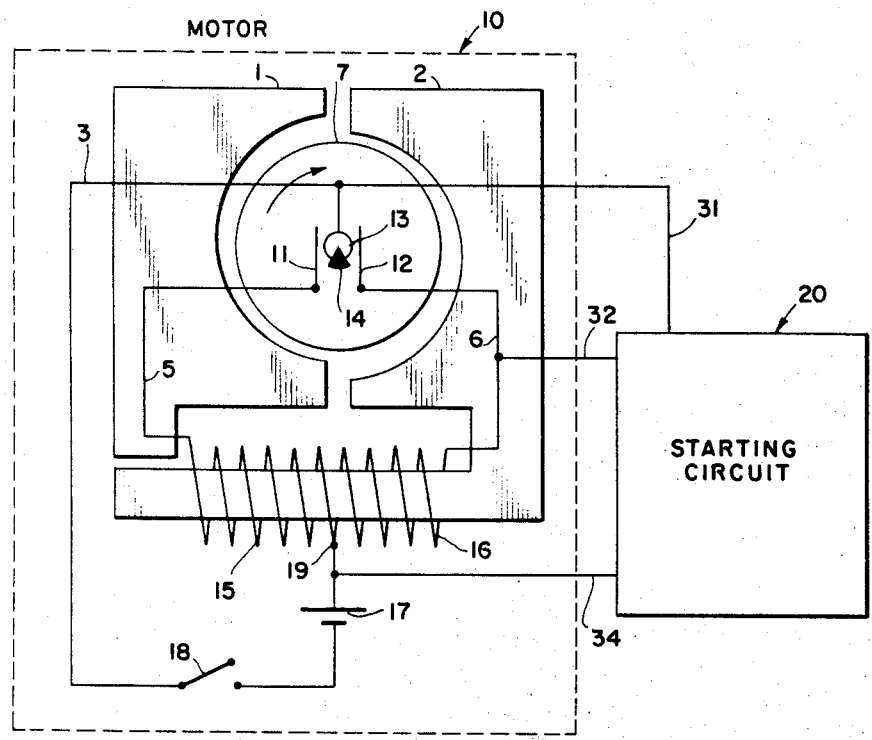

United States Patent Office 3,402,337
Patented Sept. 17, 1968

3,402,337
ELECTRICAL MOTOR STARTING ARRANGEMENT
Floyd L. Malmborg, Lincoln Park, and Francis E. Sellinger, Jr., Somerset, N.J., assignors to American District Telegraph Company, Jersey City, N.J., a corporation of New Jersey
Filed June 13, 1966, Ser. No. 557,110
5 Claims. (Cl. 318—254)

This invention relates to electrical motors, and in particular to arrangements for assisting in the starting of electrical motors.

Electrical motors are employed in a number of situations where extremely high standards of reliability are demanded. One such application is in electrical protection systems in which various kinds of detection devices at widely dispersed locations are monitored from a central office. Actuation of such detection devices may involve starting an electrical motor at a remote location in order to perform some desired function, for example, to initiate transmission of a coded warning signal to the central office so that proper corrective action may be taken. It is particularly important in fire and burglary detection systems that electrical motors employed at remote, unattended locations start when required, since a failure to transmit a timely warning signal to the central office may be disastrous.

In some varieties of electrical motors, as exemplified by the motor described in H. D. Brailsford Patent 2,457,637, issued Dec. 28, 1948, starting depends upon the rotor member being in electrical contact with one or the other of a pair of brushes when an electrical potential is applied to one terminal of a field coil, so that current will flow through a completed electrical path between coil, brush and rotor to energize the coil. However, if the rotor is not in contact with one of the brushes the electrical path is incomplete and a potential applied to terminal of the coil will fail to start the motor.

In the present invention there is provided a unique arrangement for starting a motor of the above variety regardless of whether the rotor is in electrical contact with the brush when a potential is applied. Positive starting is ensured by a starting circuit which provides a supplementary electrical path for energizing one of the field coils so that when a potential is applied to one terminal of the coil, the coil will be energized even if the rotor is not in electrical contact with one of the brushes. By energizing one of the coils in this manner, an unbalanced magnetic field is generated which moves the rotor member into contact with one of the brushes thereby to commence normal motor operation.

A special feature of this invention is automatic disablement of the starting circuit shortly after the initial application of the potential to the coil terminal. In this manner, the supplementary electrical path is disconnected from the coil to permit normal motor operation after the motor has started.

Figure 2:
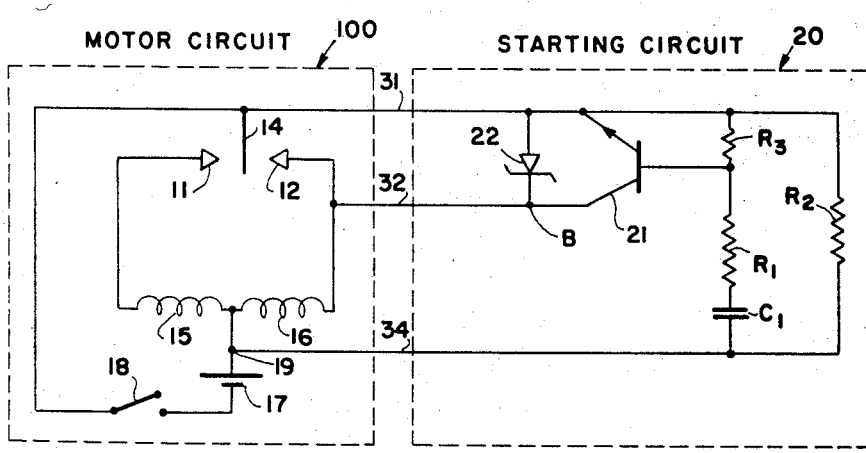

The invention will be fully understood from the following detailed description of illustrative embodiments thereof taken in connection with the appended drawings, in which:

FIG. 1 is a partially diagrammatic plan view of an electrical motor and starting circuit arrangement embodying the principles of the present invention; and FIG. 2 is a schematic diagram illustrating the electrical circuit details of the apparatus shown in FIG. 1.

Referring to the drawings, in FIG. 1 a motor 10 within the dashed lines is connected by way of leads 31, 32, 34 to starting circuit 20. In motor 10, which is more fully described in H. D. Brailsford Patent 2,457,637, issued Dec. 28, 1948, and which may be represented by an equivalent electrical circuit as motor circuit 100 in FIG. 2, a winding having two field coils 15, 16 with a common center tap 19 is connected to a source of direct current such as battery 17. The other ends of coils 15, 16 are respectively connected by leads 5, 6 to flexible brushes or springs 11, 12. On the shaft 13 of the rotor member (not shown) of motor 10, there is provided an eccentric contact portion 14 which is positioned in the assembled motor between the free end portions of the springs 11, 12. Brushes 11, 12 are so spaced apart that the eccentric 14 makes contact with brushes 11, 12 in alternate sequence as the rotor member rotates. The shaft 13 of the motor is conductive and is connected by lead 3 and switch 18 to the other terminal of battery 17.

In the rest or turned off condition of motor 10, that is, with switch 18 open, eccentric 14 ordinarily makes contact with either brush 11 or brush 12. In this manner, when switch 18 is closed, an electrical path is immediately completed from battery 17 through brush 11 or brush 12 to the corresponding coil 15 or 16. The establishment of this path energizes the corresponding coil to induce a magnetic field in field poles 1, 2 and thereby rotate the permanently magnetized armature 7 also mounted on shaft 13. Continued rotation of shaft 13 causes eccentric 14 to break contact with one of the brushes 11, 12 and make contact with the other brush. This change in contact deenergizes the coil previously energized and energizes the other coil, thereby reversing the polarity of the magnetic field induced in field poles 1, 2 to continue the rotation of armature 7 until such time as switch 18 is opened. As shown in FIG. 1, the normal direction of rotation of armature 7 is in a clockwise direction.

When switch 18 is opened to turn off motor 10, eccentric 14 ordinarily comes to rest on either brush 11 or 12 in order to provide immediate starting when switch 18 is subsequently closed. However, in the event that eccentric 14 comes to rest at a point such that it fails to make contact with either brush 11 or 12, as shown in FIG. 1, the subsequent closing of switch 18 will fail to complete the electrical circuit and motor 10 will not start.

In order to ensure positive starting of motor 10 regardless of whether eccentric 14 comes to rest on either of the brushes 11, 12, a starting circuit 20 is connected to motor 10 by way of leads 31, 32, 34. Referring to FIG. 2 in addition to FIG. 1, the application of positive voltage at point 19, corresponding to the closing of switch 18, causes current to flow through uncharged capacitor $C_1$ in series with resistor $R_1$ to the control terminal of a switching or gating element. In FIG. 2, the switching or gating element is shown as a transistor in which the control terminal is the base-emitter junction, transistor 21 being of any well known switching variety. The other terminal of coil 16 is connected to the input or collector terminal of element 21, and the output or emitter terminal of element 21 is connected to the other side of battery 17 via switch 18. The current applied to the base of transistor 21 turns on transistor 21, thus completing a supplementary electrical path for current to flow through coil 16 and to set up an induced magnetic field in field pole 2. Assuming that eccentric 14 has come to rest without contacting either brush 11 or brush 12, as shown in FIGS. 1 and 2, this magnetic field causes armature 7 to move in a clockwise direction, thereby bringing eccentric 14 into contact with brush 11. When eccentric 14 contacts brush 11, motor 10 then starts its normal operation and armature 7 rotates in a clockwise direction. Alternatively, assuming that eccentric 14 had come to rest in a position 180 mechanical degrees from the position shown in FIG. 1, the energizing of coil 16 through the supplementary electrical path provided by starting circuit 20 causes armature 7 to move initially in a counter-clockwise direction to bring eccentric 14 into contact with brush 11, following which normal operation of motor 10 commences with a reversal in the direction of initial rotation of armature 7 to its usual clockwise rotation.

Starting circuit 20 is automatically released from its control of motor 10 by the charging of capacitor $C_1$ to a predetermined charge level which acts to shut off transistor 21. By appropriate selection of the time constant for capacitor $C_1$, the time required for $C_1$ to become sufficiently charged can be made sufficiently short so that transistor 21 is shut off at a relatively short interval of time after switch 18 is closed. A suitable time constant for using this motor in electrical protection systems of the central office variety is on the order of 14 to 25 milliseconds at a rated voltage of 6 volts.

Resistor $R_3$ in the base circuit of transistor 21 ensures that transistor 21 remains turned off when capacitor $C_1$ is fully charged, and resistor $R_2$ provides a path for the discharge of capacitor $C_1$ when power is removed from point 19. Zener diode 22 is provided to protect transistor 21 from voltage surges.

It is to be observed that only one of the two coils 15, 16 is employed with starting circuit 20 to ensure positive starting of motor 10, since it is desired to create an unbalanced magnetic field when eccentric 14 fails to make contact with either brush 11 or brush 12 in the turned off condition of motor 10. Although FIG. 2 shows coil 16 employed with starting circuit 20, it is to be understood that if desired coil 15 could be so employed instead. Also, with the arrangement shown in FIG. 2, there is a slight delay in starting in the situation where eccentric 14 is in contact with brush 11 in the rest position, since the closing of switch 18 simultaneously energizes both coil 15 and coil 16, coil 15 via the conventional path through lead 3, eccentric 14, and brush 11, and coil 16 via starting circuit 20 as described above. The approximately equal but oppositely directed magnetic fields thus simultaneously set up by coils 15 and 16 tend to prevent armature 7 from moving. However, the delay in starting resulting from this simultaneous energization of coils 15 and 16 is relatively short, the exact length of the delay being dependent upon the time constant of capacitor $C_1$, since as explained above, as soon as capacitor $C_1$ is sufficiently charged, transistor 21 is turned off and coil 16 is thereby deenergized. No delay in starting is encountered, of course, in the case where eccentric 14 comes to rest on the brush corresponding to the coil cooperating with starting circuit 20, since only one coil, the cooperating coil, is energized, but through two separate paths. That is, in the arrangement shown in FIG. 2, there is no starting delay in the situation where eccentric 14 is in contact with brush 12 with motor 10 turned off.

Suitable components for starting circuit 20 are specified in Table 1 below.

Table 1

| | |
|---|---|
| Transistor 21 | 2N3415 |
| Zener diode 22 | 1N4742 |
| Capacitor $C_1$ microfarads | 10 |
| Resistor $R_1$ ohms | 470 |
| Resistor $R_2$ do | 15,000 |
| Resistor $R_3$ do | 51,000 |

Although transistor 21 is shown here as a specific example of an appropriate switching element, it is to be understood that other well known gating or switching devices such as electromechanical or reed relays could be used instead, if desired.

Although this invention has been described in terms of an electrical motor of the type shown in the drawings, it is to be understood that applications of the starting circuit of this invention are not limited to a specific electrical motor but include any electrical motor in which starting depends upon completing an electrical path through a particular portion or element of the motor. Also, it is to be understood that the above-described embodiments are merely illustrative of the numerous arrangements which may be devised for the principles of this invention by those skilled in the art without departing from the spirit and scope of the invention.

The terms and expressions that have been employed herein are used as terms of description and not of limitation, and there is no intention in the use of such terms and expressions to exclude any equivalents of the features shown and described or portions thereof, but it is recognized that various modifications are possible within the scope of the invention claimed.

What is claimed is:

1. In an electrical motor characterized by a plurality of field poles, a corresponding plurality of energizable field coils each having one terminal connected electrically to the first terminal of a source of current, a magnetic rotor member mounted on a shaft between said field poles, said shaft bearing an eccentric and adapted to be connected to the second terminal of said source of current, and a plurality of brush members each connected electrically to the other terminal of a corresponding one of said field coils and positioned for electrical contact with said eccentric to effect energization of the corresponding field coil with said eccentric connected to said source of current, a starting circuit which comprises a switching element provided with a control terminal, an input terminal, and an output terminal, means responsive to current from said source of current for connecting said control terminal to the first terminal of said source of current for a selected interval of time to energize said switching element for a corresponding interval of time, means for connecting the other terminal of one of said field coils to the input terminal of said switching element, and means adapted to connect the output terminal of said switching element to the second terminal of said source of current, so that with the output terminal of said switching element connected to said second terminal of said source of current that one of said field coils connected to the input terminal of said switching element is energized for said selected interval of time after said current source is connected to the output terminal of said switching element.

2. Apparatus as defined in claim 1 wherein said switching element is a transistor having its base connected to said control terminal, its collector connected to said input terminal, and its emitter connected to said output terminal.

3. Apparatus as defined in claim 1 wherein said means for connecting said control terminal to the first terminal of said source of current comprises a first resistor and a capacitor in series provided with a time constant chosen so that said switching element is energized for said selected interval of time until the charge on said capacitor reaches a predetermined level, a second resistor connected between said first terminal of said current source and said output terminal of said switching element to provide a discharge path for said capacitor in the absence of a connection between said output terminal of said switching element and said second terminal of said source of current, and a third resistor connected between said control terminal and said output terminal of said switching element to ensure that said switching element remains deenergized after said charge on said capacitor reaches said predetermined level.

4. In combination with the apparatus defined in claim 1, a Zener diode connected between said input terminal and said output terminal of said switching element to protect said switching element from voltage surges.

5. A circuit for starting an electrical motor by providing a supplementary electrical path for the flow of electrical current from a first terminal of a current source through a selected element of said motor to a second terminal of said current source, said selected element being connected at a first one of its two terminals to said first terminal of said current source, which comprises
- a switching element provided with a control terminal, an input terminal, and an output terminal,
- means for connecting the second terminal of said selected element of said motor to said input terminal of said switching element,
- means for switchably connecting the output terminal of said switching element to the second terminal of said current source,
- a first resistor and a capacitor in series for connecting the first terminal of said current source to said control terminal of said switching element,
- a second resistor connected between said control terminal and said output terminal of said switching element,
- a third resistor connected between said first terminal of said current source and said output terminal of said switching element, and
- a ZENER diode connected between said input terminal and said output terminal of said switching element.

References Cited

UNITED STATES PATENTS 3,174,088  3/1965  Müller _____ 318—254 XR
3,264,538  8/1966  Brailsford _____ 318—254 XR ORIS L. RADER, *Primary Examiner.*

G. RUBINSON, *Assistant Examiner.*